United States Patent Office 3,441,549
Patented Apr. 29, 1969

3,441,549
ACRYLATES OF NF₂-CONTAINING POLYETHERS
John B. Gardiner, Mountainside, and Anthony J. Passannante, Metuchen, N.J., assignors to Esso Research and Engineering Company, a corporation of Delaware
No Drawing. Filed Sept. 11, 1962, Ser. No. 224,885
Int. Cl. C08f *3/64*; C07c *135/00, 87/26*
U.S. Cl. 260—88.3                          14 Claims This invention relates to high-energy acrylate and polyacrylate binders containing $NF_2$ oxidizing groups and their preparation from polyethers containing $NF_2$ groups.

The high-energy oxidizer binders obtained from $NF_2$-containing polyether acrylates are demonstrated to have improved chemical and physical characteristics for use in solid rocket propellants which require in their formulation high-energy binders. Such binders in solid rocket propellants are employed in proportions of about 5 to 30 wt. percent of the composite to hold together other components dispersed in the binders, such as liquid oxidizers, solid oxidizers, and fuels such as powdered metals of the class comprising B, Al, Be Li and Mg, and compounds of such materials, e.g. their hydrides.

With advances in the art of preparing high-energy binders, it has been found that a number of properties of the binders should and can be improved, as, for example, the properties of stability in various liquid oxidizers, flexibility and rubbery qualities, tensile strength, heat of polymerization, low sensitivity to impact, and energy content.

The new type of binder provided by the present invention is believed to make improvements in such properties as mentioned.

To make the high-energy polyether acrylates containing $NF_2$ groups, the starting materials are polyethers having a suitable high content of $NF_2$ groups and OH functionality. Some of the $NF_2$-containing polyethers may be made by epoxidizing an $NF_2$-containing olefin and polymerizing the $NF_2$ containing epoxide. The preferred $NF_2$-containing polyethers have been made by reacting $N_2F_4$ with unsaturated polyethers, e.g. reacting $N_2F_4$ with poly (pentadiene monoxide) which is formed by ploymerizing pentadiene monoxide as described in an application of Anthony J. Passannante et al., S.N. 219,-372, filed Aug. 22, 1962. Another exemplary $NF_2$-containing polyether is described in application S.N. 219,373 of Anthony J. Passannante et al., filed Aug. 22, 1962.

The $NF_2$-containing polyethers are acrylated preferably with an excess of acrylating agent, such as acryloyl chloride, acrylic anhydride, arcylic acid, and other acrylating agents which may have substituents and which react with OH groups in the polyethers, which are termed $NF_2$-polyether alcohols. The terms acrylates, polyacrylates, and acrylating agent are intended to include the alpha-substituted methyl and homologous modifications.

While a variety of steps may be involved in arriving at the final high-energy binder compositions, this invention is concerned in particular with the synthesis of acrylates suitable for compositing as prepolymers with loading of oxidizers and fuels before final polymerization or casting. The initial materials, insofar as the present invention is concerned, are the $NF_2$-polyether alcohols which are to be acrylated, but a brief description will be given of the preferred method for making the $NF_2$-polyether alcohols which are acrylated, and a description will be given of how the prepolymers, or polyether acrylates, are given a final polymerization to desired binder compositions.

PREPARATION OF NF₂-POLYETHER ALCOHOLS

In the preferred method of making an $NF_2$-polyether alcohol for acrylation, 1,4-pentadiene monoxide, having the formula

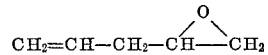

is polymerized with an epoxide polymerization catalyst, such as $PF_5$, in a proportion of 0.01 to 10% by weight at 20° to 25° C. for a period of 0.5 to 72 hours to obtain a polymer having a molecular weight in the range of about 500 to 5000 with terminal OH groups attached to the chain of recurring units. The OH functionality of the polyether may be controlled by using modifiers, such as glycidol, ethylene glycol, water, or trimethylol propane.

The resulting unsaturated polyether reacts with $N_2F_4$ smoothly and an excess of $N_2F_4$ is used in chloroform or other halogen-substituted alkane solution at 80° to 100° C. The resulting $N_2F_4$ adduct of the unsaturated polyether contains $NF_2$ groups attached to the carbons which were linked together by the double bond and this adduct, which may be termed poly (4,5-bis-(difluoramino)-pentene-1 oxide), has the structural formula:

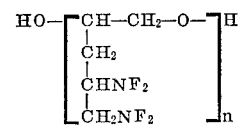

In this polyether, the recurring unit is present in a number $n$ times, for example, 2 to 30. The number of OH groups on the chain depends on the method of terminating the chain and, generally, is an average of 1.5 to 2.5 or 3 OH groups per molecule, but may be higher.

A still higher energy $NF_2$-polyether alcohol is made by polymerizing divinyl ethylene oxide with an epoxide polymerization catalyst, preferably $PF_5$, and reacting the resulting unsaturated polyether alcohol with $N_2F_4$ to obtain the polymer poly (1,2,5,6-tetrakis-(difluoramino)-hexene-3 oxide) represented as:

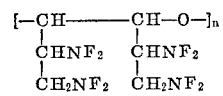

This polymer, having four $NF_2$ groups per six carbon atoms in the recurring unit, also has OH groups terminating the chains.

ACRYLATION OF NF₂-POLYETHER ALCOHOLS

Acrylation of the $NF_2$-polyether alcohols to form polymers that give satisfactory rubbery binders has been demonstrated as shown in the following example.

Example 1.—Acrylation of poly (bis-(NF$_2$-pentene-1 oxide)

The reaction mixture components used were:

2.0 g. (.0017 mole) direct addition poly-bis-(NF$_2$) pentene oxide (mol. wt. 1170);
2.28 g. (.0253 mole) acryloyl chloride;
10 ml. benzene-acetonitrile (80–20% vol.) solvent;
.01 g. CuCl (anhydrous) inhibitor for acryloyl chloride polymerization.

The components were mixed under N$_2$ for 2 hours at 25° C. and then 1 hour at 50° C. The solvent and acryloyl chloride excess were removed under vacuum, giving an amber polymer (mol. wt. 1200) oil.

acrylate is purified to improve its stability by dissolving in a solvent, e.g. CH$_2$Cl$_2$, washing with aqueous NaHCO$_3$, following washing with water and drying with anhydrous Na$_2$SO$_4$ and then filtering. Such washing eliminates residual acid chloride and acid, thus making the polymer more thermally stable during storage and at elevated temperatures.

In making NF$_2$-polyether acrylates as described in this example, the polyether was subjected to modification of water, ethylene glycol, and glycidol. The NF$_2$-polyethers, the acrylates derived therefrom, and the polyacrylates formed as a final binder product were analyzed to give the following inspections.

TABLE I.—NF$_2$-POLYACRYLATES FROM N$_2$F$_4$ ADDUCT OF POLYPENTADIENE MONOXIDE

| Polyether | Water Modified | Ethylene Glycol Modified | Glycidol Copolymer |
|---|---|---|---|
| Molecular weight | 1,266 | 1,260 | 2,389 |
| OH/Chain (via IR) | 1.46 | 1.62 | 1.79 |
| IR Absorbance Ratio:[1] | | | |
| HO/CH-CH$_2$ | .404 | .485 | .301 |
| NF$_2$, wt. percent (N+F) | 53.0 | 52.7 | 49.9 |
| Derived Acrylate:[2] | | | |
| Acryloyl Chloride/Polyether (equivalents) | 7/1 | 13/1 | 24/1 |
| Appearance | ([4]) | ([4]) | ([5]) |
| IR Absorbance Ratio:[1] | | | |
| HO/CH-CH$_2$ | .052 | .047 | .037 |
| C=O/CH-CH$_2$ | 2.2 | 2.1 | 1.6 |
| Derived Polyacrylates,[3] Elemental Analyses: | | | |
| NF$_2$, wt. percent (N+F) | 53.4 | 50.4 | 51.9 |
| NF$_2$, wt. percent based on percent F | 54.8 | 51.4 | 53.6 |
| Cl, wt. percent | 1.48 | 1.82 | 1.53 |

[1] Ratio of the absorbance peak heights at 2.8μ (OH) and 5.8μ (C=O) to 3.4μ (CH-CH$_2$)
[2] Acrylation as described in the example given above.
[3] Polymerized acrylate using 0.3 wt. percent azoisobutyronitrile (AIBN), N$_2$ atmosphere, 50° C., for 15 hours for curing.
[4] Amber syrup.
[5] Straw syrup.

The acrylate may be polymerized with catalyst in the presence of loading by oxidizers and fuels. Polymerization of the acrylate will take place at room temperature without catalyst upon standing for a few days, or in bulk or solution with catalyst.

The NF$_2$-polyether acrylate thus made has the structural formula:

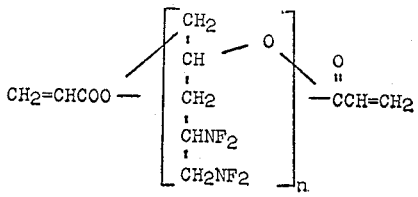

wherein the recurring unit [C$_5$H$_8$O(NF$_2$)$_2$] is present $n$ number of times, e.g. about 4 to about 50, and the terminal acrylate groups are present. This NF$_2$-polyether acrylate tends to polymerize slowly on standing. The acrylate polymer initially is completely soluble in CH$_3$CN or CH$_2$Cl$_2$, but after about 2 days insoluble gel may be formed in the solution. This NF$_2$-polyether acrylate may be polymerized in solution or bulk, as will be later described.

Example 2

The acrylation of the NF$_2$-polyether is performed with an excess of acrylating agent, e.g. acryloyl chloride, from 4:1 to 24:1 stoichiometric excess. ZnCl$_2$ may be used as catalyst instead of Cu$_2$Cl$_2$ for faster and more complete acrylation, as in the following typical preparation using the components:

2.78 g. (.0012 m.) poly-bis-(NF$_2$)-pentene-1 oxide;
4.56 g. (.0504 m.) acryloyl chloride (0.1% Cu$_2$Cl$_2$ polymerization inhibitor);
10 ml. acetonitrile (Eastman 488-dry grade);
0.011 g. ZnCl$_2$, powdered anhydrous.

The mixture of the above components is heated under N$_2$ for 3 hours at 50° C. The infrared spectra showed that the OH content has been reduced to 0.01 to 10% of its initial value and ester has appeared. The NF$_2$-polyether Example 3

NF$_2$-polyether acrylate is made by acrylating with a trifluoroacetic anhydride-acrylic acid mixture containing the components:

.64 g. (.0008 mole) of H$_2$O modified by poly-bis-(NF$_2$) pentene-1 oxide (800 mol wt.);
4.2 g. trifluoroacetic anhydride (0.2 mole);
1.4 g. acrylic acid (.0195 mole).

This anhydride was added to the acid at 20° C., 15 mins. The flask was then cooled to 0° C. by ice bath and the polyether was added in 2 ml. of CH$_2$Cl$_2$ over 15 mins. at 0° C. Stir at 0° C. for 30 mins. Add 30 ml. ice water and stir for 15 mins. Extract with CH$_2$Cl$_2$, wash with NaHCO$_3$ (saturated) solution 2–5 times, and then distilled water twice. Dry with Na$_2$SO$_4$ (anhydrous), filter and store in solution at −20° C. under air.

Washing the polyether acrylates improves the stability of the final polyacrylate.

A suitable method found for storing the acrylates up until the time they are to be further polymerized in making a rocket propellant composite comprises dissolving the NF$_2$-polyether acrylate with the CH$_2$Cl$_2$ to form a dilute solution under N$_2$ or air with a small amount of polymerization inhibitor, 0.01 wt. percent of 2,3-dicyano-1,4-benzoquinone, and maintaining the solution containing the inhibitor at a low temperature, e.g. −24° C. The NF$_2$-polyether acrylate, particularly if it is not well purified, is unstable and tends in air and at room temperature storage to form a sticky and weak polyacrylate when final polymerization is attempted. The final polymerization of the acrylates is intended to form a tough, rubbery product of high tensile strength.

POLYMERIZATION OF NF$_2$-POLYETHER ACRYLATES

The polymerization of the NF$_2$-polyether acrylates is intended to yield and has yielded crosslinked rubbers of good strength. Studies have shown that the crosslinked rubbers are insoluble in many ordinary solvents, and that any of the material which is soluble, such as formed in unsuccessful polymerizations, are low molecular weight. The satisfactory rubbery polymers are insoluble in tetrakis-($NF_2$)-furan, tetrakis-($NF_2$) butane, acetone, $CH_3CN$, benzene, $CH_2Cl_2$, $CHCl_3$, $CCl_4$, and $H_2O$, leaving little doubt that they are appreciably crosslinked.

For the polymerization, many of a variety of polymerization initiators may be used. Suitable initiators are represented by azoisobutyronitrile, 2,4-dichlorobenzoyl peroxide, and benzoyl peroxide. These initiators are used in concentrations of about 0.1 to 1 wt. percent and the polymerization is carried out at temperatures usually of about 25° to 75° C., the polymerization being completed in about 10 to 16 hours to obtain tough, tacky, rubbery polymers.

The polymerization can be carried out with the $NF_2$-polyether acrylate dissolved in any of the solvents, such as the liquid ($NF_2$) butane, benzene, $CH_3CN$, or the halogenated hydrocarbons, or mixtures of such solvents, and with the use of the polymerization initiators as mentioned. The polymerization may be carried out under vacuum or in an inert atmosphere, such as $N_2$. The time of cure varies with the initiator and temperature. During the polymerization, other crosslinking agents may be used for crosslinking the polyacrylates in the absence of or in the presence of loading, for example, ethylene diacrylate, tetramethyl diacrylate, to give more strength and rigidity. For chain extension of the $NF_2$-polyether acrylates, they can be copolymerized with other acrylates that may contain $NF_2$, e.g. bis-($NF_2$)-propyl acrylate, or one with the other. Inspections on the polymerized $NF_2$-polyether acrylates are given in the following table.

the polyether through the addition of $NF_2$ groups. The resulting $NF_2$-polyether is then acrylated in the manner which has been described.

The acrylate of the poly (divinyl ethylene oxide-$N_2F_4$ adduct) is characterized by the unit composition

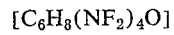

and is represented by the following structure:

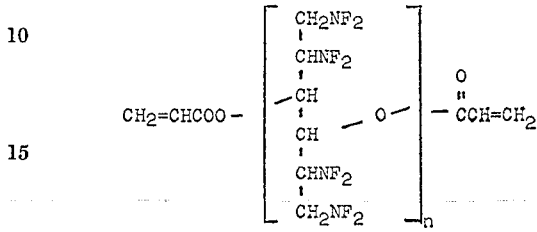

The acrylate of the $N_2F_4$ adduct of polybutadiene oxide is characterized by the unit composition

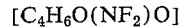

and is represented by the structure:

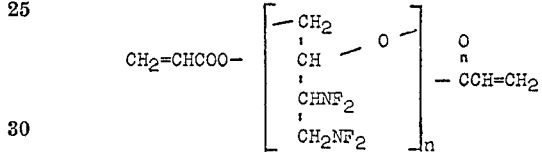

TABLE II.—POLY ($NF_2$-POLYETHER ACRYLATES)

| Properties | PPMOA Acrylate [1] | | |
| --- | --- | --- | --- |
| | Water Modified | Ethylene Glycol Modified | Glycidol Copolymer |
| Appearance | Clear brown | Clear brown | Clear amber. |
| Consistency | Tough, tacky rubber | Tough, tacky rubber | Tough, tacky rubber. |
| Gel Fraction [2] | .791 | .782 | .815. |
| Tensile Strength, p.s.i.[3] | 181 (avg. of 7) | 166 (avg. of 4) | 133 (avg. of 3). |
| Max Tensile, p.s.i.[3] | 222 | 200 | 145. |
| Elongation at Break, percent [3] | 135 (avg. of 7) | 92 (avg. of 4) | 104 (avg. of 2). |
| Vac. Therm. Stab., 90° C. in ml. of gas/g. at 45 hrs | 25.8 | 40.8 | 148 (extrapolated). |
| DTA Exotherm, ° C.[4] | 152 | 150 | 154. |
| Impact Sens., Kg. In. (Smoke) | 18 | 28 | 18. |

[1] Washed, acrylated polyether cured with 0.3 wt. percent AIBN at 50° C. for 15 hours under $N_2$.  [2] Wt. insoluble/wt. total after 24 hour Soxhlet extraction with $CH_2Cl_2$.  [3] As in [1] cast in a thin film on a glass plate, pulled as a film.  [4] Different thermal analysis.

FORMULATIONS WITH POLY ($NF_2$-POLYETHER ACRYLATES)

Test loadings of the $NF_2$-polyether acrylates with various liquid oxidizers, solid oxidizers, and fuels were made, and after polymerization and curing of the binder, the solid rocket propellant composites were tested for physical properties. As an example, test bars in the shape of dumbbells were made by loading the $NF_2$-polyether acrylate with 80 wt. percent ammonium perchlorate, then curing during polymerization in a mold which compressed the bars at about 5000 p.s.i. The loaded binder was found to have good tensile strengths above 250 p.s.i.

Other test formulations have contained 10 to 30 wt. percent of the $NF_2$-polyether acrylate mixed with 10 to 35 wt. percent of tetrakis-($NF_2$)-furan or tetrakis-($NF_2$)-butane, 30 to 60 wt. percent of ammonium perchlorate fines, 4 to 6 wt. percent of boron powder or 5 to 25 wt. percent aluminum powder, and polymerization initiator for curing in the manner described.

Steps used in preparing the $NF_2$-polyether acrylates and polymers of these acrylates which have been described in detail with reference to poly (bis-($NF_2$)-pentene-1 monoxide) apply also to the acrylates and polyacrylates made from the $N_2F_4$ adduct of polybutadiene monoxide and $N_2F_4$ adduct of poly (divinyl ethylene oxide). In each instance, the unsaturated polyether is formed by polymerizing the unsaturated oxide, e.g. divinyl ethylene oxide and butadiene oxide, with an epoxidizing catalyst such as $PF_5$, then the resulting unsaturated polyether is reacted with $N_2F_4$ to saturate the double bonds in It will be noted that in the illustrative structures, it is possible for a number $n$ of the polyether groups, indicated by the recurring unit, to be joined to the terminal acrylate or acryloyl groups which contain double bonds through which further polymerization can take place so as to form polyacrylates. The polyether chains may be of various molecular weight, depending on the consistency desired for final formulation or use. With high-energy plasticizers, higher molecular weight $NF_2$-polyether acrylates of higher viscosity may be used to prevent settling of solid components from the composite before or during casting and curing.

The $NF_2$-polyether acrylates and their polymers have been made to contain 49 and more wt. percent $NF_2$. The polymers of this type which contain less $NF_2$ can be made, but are not as attractive for use as a high-energy oxidizer binder.

The acrylates of the $NF_2$-polyethers given in the order of preference with respect to $NF_2$ and energy content are shown in the following table.

TABLE III

| $NF_2$-polyether diacrylate of: | $NF_2$ percent by wt. of 2000 mol. wt. diacrylate (maximum) |
| --- | --- |
| Polydivinylethylene oxide-$N_2F_4$ adduct $[C_6H_8(NF_2)_4O]_n$ | 64.8 |
| Polybutadiene oxide-$N_2F_4$ adduct $[C_4H_6(NF_2)_2O]_n$ | 56.6 |
| Polypentadiene oxide-$N_2F_4$ adduct $[C_5H_8(NF_2)_2O]_n$ | 52.5 |

The Isp (specific impulse) attainable with even the binder made from the polypentadiene oxide-$N_2F_4$ adduct diacrylate is in the range of 270 to 285.

It can be easily seen that with a higher ratio of $NF_2$ groups to carbon, the energy content of the acrylates and polyacrylates of the $NF_2$-polyethers increases. For a solid propellant composite containing 20 wt. percent of binder made from diacrylate of $[C_6H_8O(NF_2)_4]_n$ with 20 to 50 wt. percent $C_4H_6(NF_2)_4$ as liquid $NF_2$ oxidizer, 3.5 wt. percent B powder, and 57.5 to 26.5 wt. percent hydrazinium nitroformate, Isp values determined are in the range of 288 to 290.

Considering the acrylates of the $NF_2$-polyethers as described individually or mixed, a general compositional formula for these compounds is represented by:

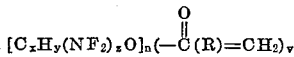

wherein the polyether recurring unit, $x$ is 4 to 6, $y$ is 6 to 8, $z$ is 2 to 4, $n$ is 4 to 50, R is hydrogen or a $C_1$ to $C_5$ alkyl substituent in the acryloyl group, and $v$ is 1 to 3.

In addition to the advantages of the physical properties and high-energy content of the polyacrylates formed from the $NF_2$-polyethers, the $NF_2$-polyether acrylates have the advantages of low heat of polymerization and low shrinkage. These polymerization properties allow a more strain-free large rocket motor to be cast with less tendency for case bonding failure, thermal cracking, voids formation and curing scorch. Low heat of polymerization, i.e. the low amount of abiabatic heat involved during the polymerization, is desirable to minimize decomposition of the polymer and of loading ingredients. As an example, in polymerizing the acrylates of the $NF_2$-polyether formed from pentadiene monoxide in the molecular range of 1000 to 3000, the amount of shrinkage during curing is in the range of about 5 to 1 volume percent and decreases with increases in the starting molecular weight of the $NF_2$-polyether acrylate. The heat involved during the polymerization of this kind of $NF_2$-polyether acrylate also decreases as the molecular weight is increased and is in the range of about 30 down to about 6 kilocalories per gram for the $NF_2$-polyether acrylate in the range of 1000 to 3000.

It will be understood that the binders made from the $NF_2$-polyether acrylates may be modified and crosslinked into complicated three-dimensional structures difficult to depict. In the polymerization, some of the participating $NF_2$-polyethers may be monoacrylates, as well as diacrylates and higher acrylates. Also, mixtures of the $NF_2$-polyether acrylates formed from different kinds of $NF_2$-polyethers may be used for copolymerizations which give chain extension and crosslinking.

The invention described is claimed as follows:

1. Acrylates of $NF_2$-containing polyethers having the compositional formula:

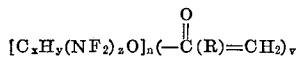

wherein the polyether recurring unit, $x$ is 4 to 6, $y$ is 6 to 8, $z$ is 2 to 4, $n$ is 4 to 50, R is of the group consisting of hydrogen and $C_1$ to $C_5$ alkyl substituent, and $v$ is 1 to 3, the $C_xH_y$ group being a substituted saturated acyclic hydrocarbon group containing the $NF_2$ substituent groups.

2. Diacrylate of poly (bis-($NF_2$)-pentene-1 oxide) having the composition:

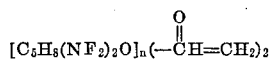

$n$ being 4 to 50.

3. Diacrylate of poly (divinyl ethylene oxide-$N_2F_4$ adduct) having the composition:

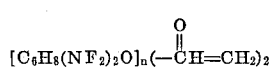

$n$ being 4 to 50.

4. Diacrylate of poly (butadiene oxide-$N_2F_4$ adduct) having the composition:

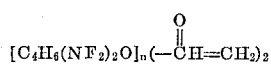

$n$ being 4 to 50.

5. Rubbery polyacrylates composed principally of the recurring unit:

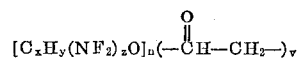

where $x$ is 4 to 6, $y$ is 6 to 8, $z$ is 2 to 4, $v$ indicates 1 to 2 of the

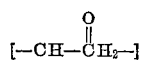

groups for 4 to 50 of the recurring $NF_2$-polyether units indicated by subscript $n$, said units being crosslinked, $C_xH_y$ group being a substituted saturated acyclic hydrocarbon group containing the $NF_2$ substituent groups.

6. Process for preparation of acrylates containing $NF_2$ groups, which comprises reacting an acrylating agent with an $NF_2$-containing polyether alcohol having the composition:

where $x$ is 4 to 6, $y$ is 6 to 8, $z$ is 2 to 4, and $n$ is 4 to 50, the $C_xH_y$ group being a substituted saturated acyclic hydrocarbon group containing the $NF_2$ substituent groups.

7. Process of claim 6, in which the acrylating agent is acrylic acid.

8. Process of claim 6, in which the acrylating agent is acrylic acid with trifluoroacetic anhydride.

9. Process of claim 6, in which the acrylating agent is acryloyl chloride.

10. Process of claim 6, in which the acrylating agent is acrylic anhydride.

11. Process of claim 6, in which the acrylated polyether is further polymerized and crosslinked to form a rubbery polymer.

12. Copolymers of $NF_2$-containing polyether acrylates having a recurring ether unit containing $NF_2$ groups as the substituent groups in a substituted saturated acyclic hydrocarbon group of 4 to 6 carbon atoms in each recurring ether unit.

13. Copolymers of $NF_2$-containing polyether acrylates defined in claim 12 in which the said acrylates are copolymerized with a reactant selected from the group consisting of ethylene diacrylate, tetramethyl diacrylate, and bis-($NF_2$)-propyl acrylate.

14. Process for the preparation of poly ($NF_2$-polyether acrylates), which comprises reacting an acrylating agent with an $NF_2$-containing polyether alcohol selected from the group consisting of poly (bis($NF_2$)-pentene-1-oxide), poly (divinyl ethylene oxide-$N_2F_4$ adduct) and poly (butadiene oxide-$N_2F_4$ adduct), modified to have about two OH groups per molecule by a modifying reactant selected from the group consisting of water, glycidol, ethylene glycol and trimethylol propane to replace the OH groups by acrylate groups, and polymerizing the resulting acrylates to form rubbery polymers.

References Cited

Farber: Astronautics August 1960, pp. 34, 40 and 42.
Hoffman et al.: Chem. Reviews, vol. 62, pp. 12 to 18 (1962).

LELAND A. SEBASTIEN, *Primary Examiner.*

U.S. Cl. X.R.

149—19, 20, 22, 44, 76; 260—86.1, 39.5, 96